United States Patent

Schmid

[11] Patent Number: 5,956,954
[45] Date of Patent: Sep. 28, 1999

[54] LINEAR DRIVE FOR A BELT TENSIONER

[75] Inventor: Johannes Schmid, Schwäbisch Gmünd, Germany

[73] Assignee: TRW Occupant Restraint Systems GmbH, Alfdorf, Germany

[21] Appl. No.: 09/093,899

[22] Filed: Jun. 9, 1998

[30] Foreign Application Priority Data

Jun. 9, 1997 [DE] Germany ............... 297 10 011 U

[51] Int. Cl.$^6$ .................................. F01B 29/08
[52] U.S. Cl. .................. 60/636; 60/637; 60/638
[58] Field of Search ............... 60/632, 636, 637, 60/638

[56] References Cited

U.S. PATENT DOCUMENTS

| | | | |
|---|---|---|---|
| 3,242,666 | 3/1966 | Peterson | 60/636 |
| 4,422,669 | 12/1983 | Chiba et al. | 60/636 X |
| 5,553,890 | 9/1996 | Buhr et al. | 60/632 X |

FOREIGN PATENT DOCUMENTS 29520307  12/1995  Germany .

*Primary Examiner*—Hoang Nguyen
*Attorney, Agent, or Firm*—Tarolli, Sundheim, Covell, Tummino & Szabo

[57] ABSTRACT

A linear drive for a belt tensioner comprises a pyrotechnic propellant charge, a cylinder tube and a piston displaceably arranged therein. The propellant charge, upon ignition, provides a pressurized gas acting on the piston. The piston has a hollow interior adapted to be subjected to the pressurized gas and an axial end at which an end wall is provided. The end wall has a bursting disc arranged facing the interior of the piston and a through opening formed by a stepped bore. The stepped bore has a first section facing the interior of the piston and is provided with an edge facing the interior, and a second section adjacent the first section. The second section has a diameter which is smaller than a diameter of the first section. The bursting disc abuts at the edge of the first section of the stepped bore.

2 Claims, 4 Drawing Sheets

LINEAR DRIVE FOR A BELT TENSIONER

BACKGROUND OF THE INVENTION

A conventional belt tensioner, as described in U.S. patent application Ser. No. 760,907 filed on Dec. 6, 1996, comprises a cylinder tube, a piston displaceably arranged therein, which has a hollow interior and an end wall at one axial end, which end wall is provided with a through opening and on the side of the interior of the piston is provided with a bursting disc, and a pyrotechnic propellant charge which following its ignition acts upon the interior of the piston with pressurized gas.

In the case of need, the propellant charge is ignited, so that the piston can perform a tensioning stroke under the action of the generated gas, which tensioning stroke is converted by the belt tensioner into a rotation of a belt spool of a belt winder in the winding direction. Thereby, the so-called belt slack is pulled out from the belt system so that in an accident the vehicle occupant participates in the vehicle deceleration as early as possible. In order to ensure that no danger originates from the propellant charge and the linear drive even with an ignition of the propellant charge under the most unfavorable of circumstances, for example in the case of misuse, overheating by vehicle fire or if the vehicle occupant already performs a movement forward, the through opening in the end wall of the piston and also the bursting disc are provided. In the case of an excessively high pressure in the interior of the piston, the bursting disc opens the through opening so that the pressure can escape from the interior of the piston and that a bursting of the cylinder tube is prevented, without the latter having to be constructed so as to be particularly strong.

BRIEF DESCRIPTION OF THE INVENTION

The invention is directed to a development of such a linear drive. A linear drive for a belt tensioner comprises a pyrotechnic propellant charge, a cylinder tube and a piston displaceably arranged therein. The propellant charge, upon ignition, provides a pressurized gas acting on the piston. The piston has a hollow interior adapted to be subjected to the pressurized gas and an axial end at which an end wall is provided. The end wall has a bursting disc arranged facing the interior of the piston and a through opening formed by a stepped bore. The stepped bore has a first section facing the interior of the piston and is provided with an edge facing the interior, and a second section adjacent the first section. The second section has a diameter which is smaller than a diameter of the first section. The bursting disc abuts at the edge of the first section of the stepped bore. This design offers a wide scope of constructional freedom. By selecting the diameter of the first section of the stepped bore, the pressure value can be adjusted, at which the bursting disc is to break. By selecting the diameter of the second section of the stepped bore, the mass flow through the end wall of the piston in the case of a destroyed bursting disc can be defined.

Advantageous developments of the invention read from the sub-claims.

BRIEF DESCRIPTION OF THE DRAWINGS

The invention is described hereinbelow with reference to a preferred embodiment, which is explained with the aid of the drawings, in which.

DETAILED DESCRIPTION OF THE INVENTION

Figure 1:
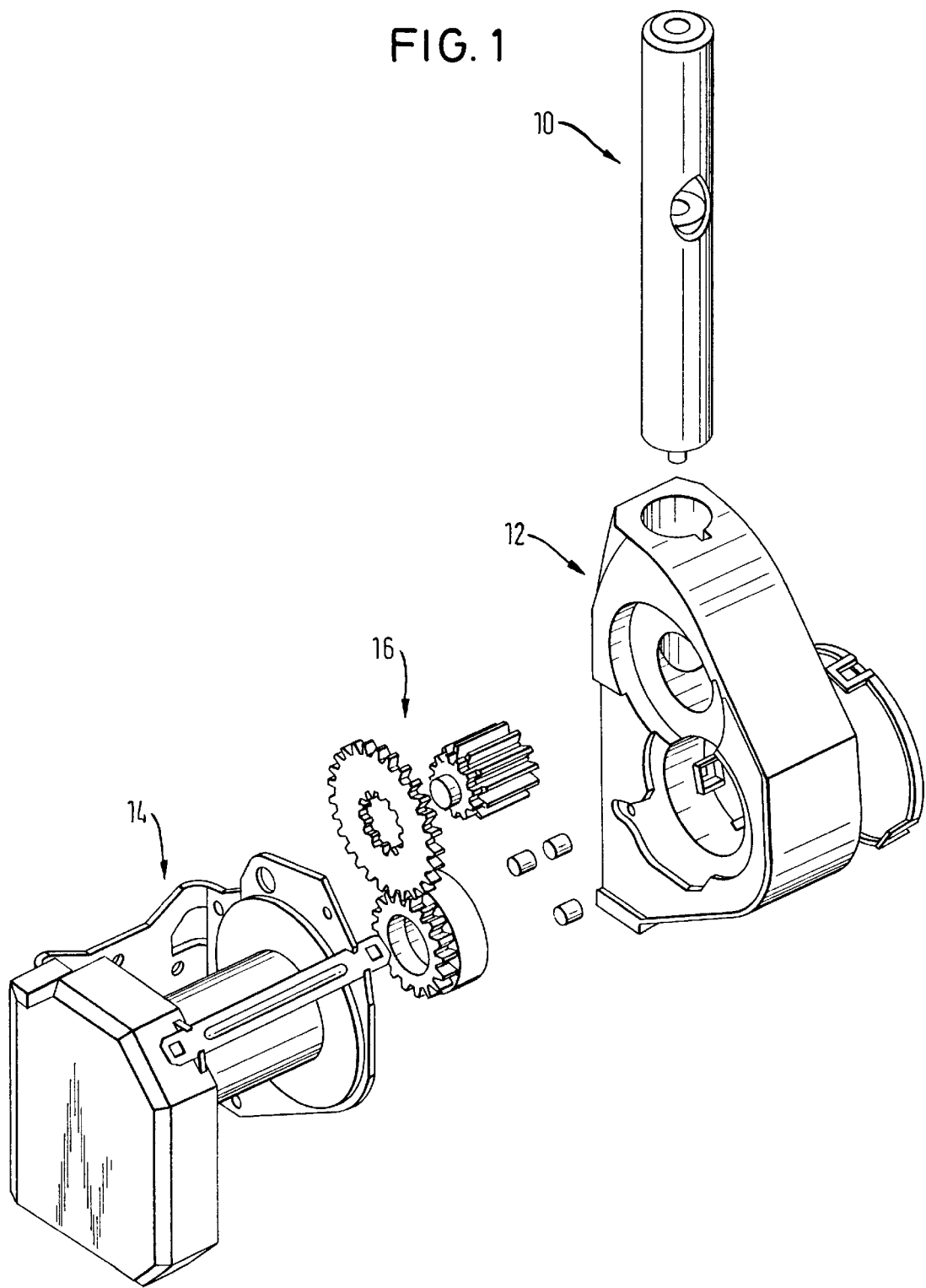
FIG. 1 shows an exploded view of a belt tensioner which is provided with a linear drive according to the invention.

FIG. 1 illustrates, in an exploded view, a linear drive 10 according to the invention and also an associated belt tensioner 12 and a belt winder 14, on which belt winder 14 the belt tensioner 12 engages by means of a transmission gear 16.

Figure 2:
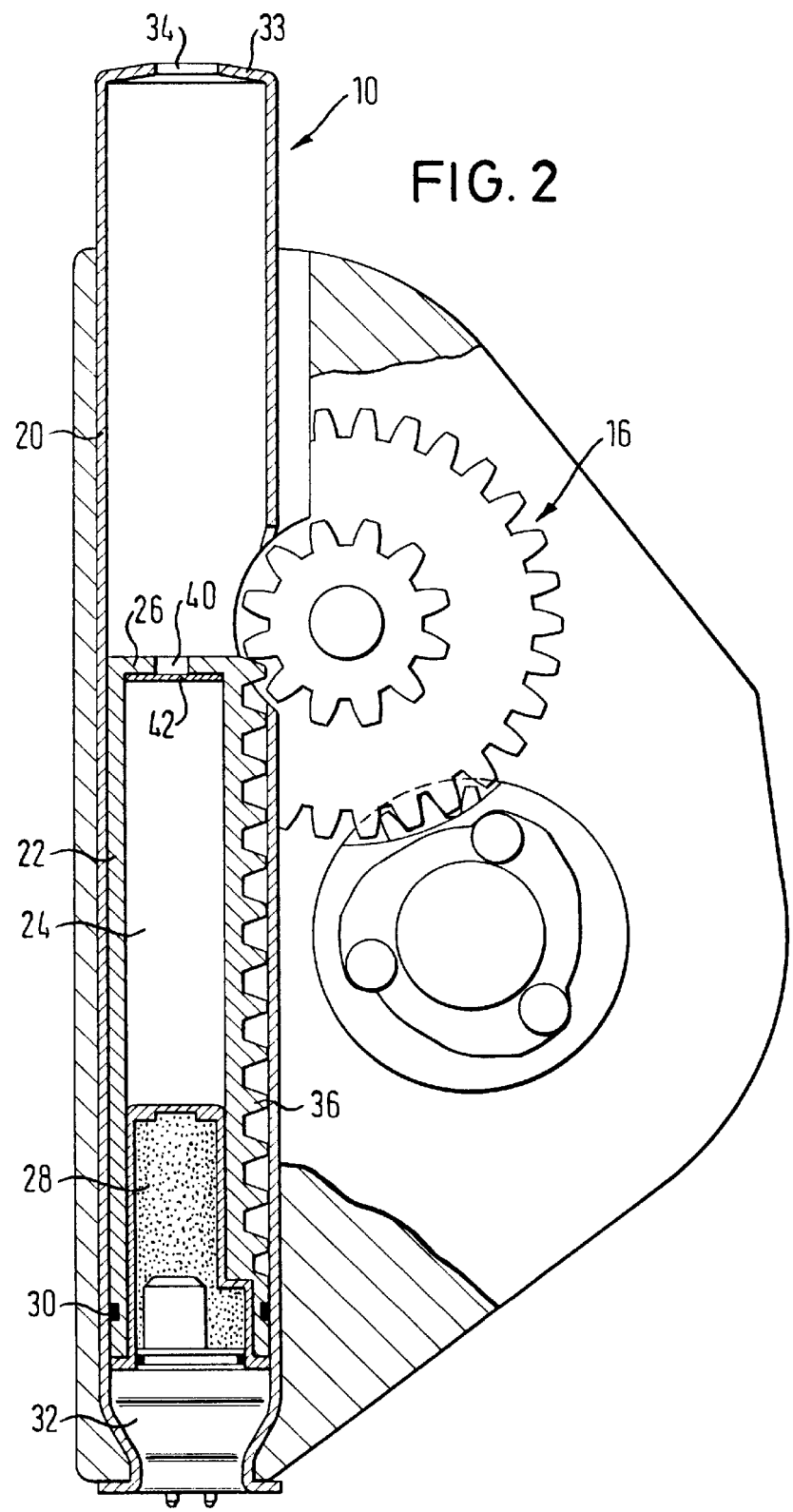
FIG. 2 shows in a view partially in section a linear drive according to the prior art.

As can be seen in FIG. 2, the linear drive 10 consists of a cylinder tube 20 and a piston 22 displaceably arranged therein. The piston 22 has a hollow interior 24, which has an end wall 26 at one axial end and has a pyrotechnic propellant charge 28 at the opposite axial end. Between the cylinder tube 20 and the piston 22, a sealing ring 30 is arranged on the latter. At its lower end in terms of FIG. 2, the cylinder tube 22 is closed by a closure plug 32, which also carries the ignition contacts for an ignition of the propellant charge 28. At its opposite end the cylinder tube 20 is provided with a piston stop safety arrangement 33 with an opening 34. The opening 34 serves for venting the cylinder tube 20 in a tensioning stroke of the piston 22.

The piston 22 has on its envelope surface a toothing 36 extending parallel to the longitudinal axis of the piston 22, which toothing 36 can cooperate with a toothed wheel of the gearing 16 in order to convert a tensioning stroke of the piston 22 into a rotary movement which is transferred as a rotation in the belt webbing winding direction to the belt spool of the belt winder 14. Such a tensioning stroke is triggered by the propellant charge 28 being ignited. The propellant charge provides for a pressurized gas, which acts upon the interior of the piston and leads to a displacement of the piston 22 in the cylinder tube 20.

The end wall 26 of the piston 22 has a through opening 40 extending in the longitudinal direction of the piston. A bursting disc 42 is arranged on the end wall on the side of the interior, which bursting disc 42 closes the through opening 40. The bursting disc 42 ensures that above a predetermined pressure in the interior 24 of the piston 22 the through opening 40 is opened and the pressure can escape from the interior of the piston 22. In this way, it is ensured that also in the case of an ignition of the propellant charge in the most unfavorable instance, for example with the piston 22 locked in the initial position, no excessively high gas pressure can build up in the interior of the piston 22, which leads to a risk of bursting of the linear drive. The construction described hitherto is known from German Utility Model 295 20 307.

Figure 3:
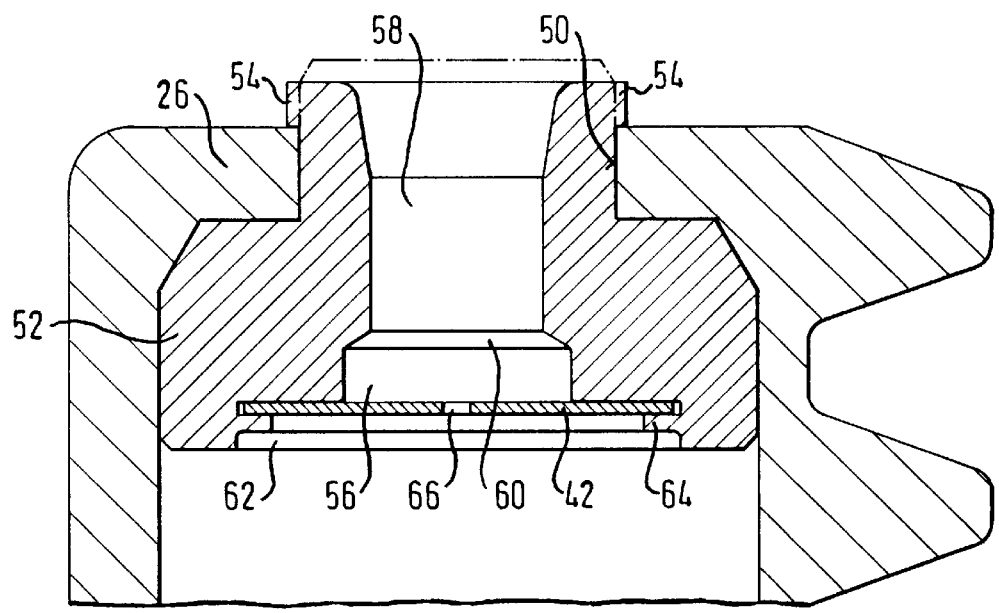
FIG. 3 shows in a sectional view an end of the piston of a linear drive according to the invention.
Figure 4:
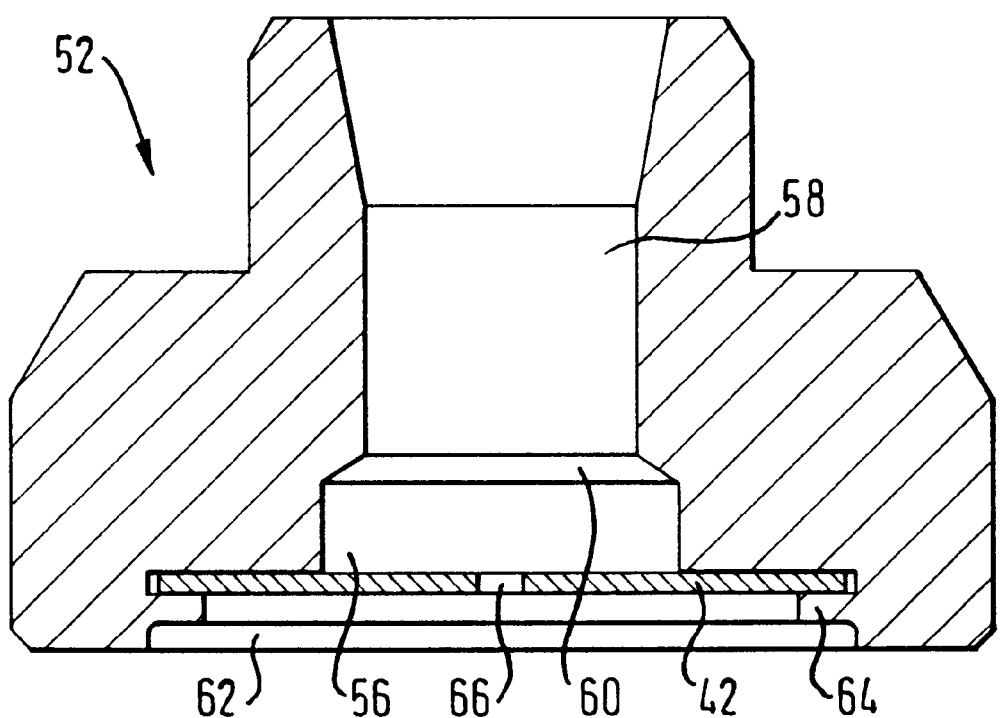
FIG. 4 shows in a sectional view a plug with bursting disc, which is used in the linear drive according to the invention.

FIGS. 3 and 4 show the end wall 26 in its construction according to the invention. The end wall 26 is provided with a mounting or accommodation 50, into which a plug 52 is inserted. This plug 52 projects from the mounting 50 and is beaded outside the piston such that local material projections 54 are formed which hold the plug 52 against the end wall 26.

The plug 52 comprises the through opening 40, which is embodied with a first section 56 and a second section 58. The diameter of the first section is greater than the diameter of the second section. A transition 60 in the form of a truncated cone is provided between the first section 56 and the second section 58 of the stepped bore. The second section 58 of the stepped bore is widened in the form of a truncated cone at its end facing the exterior.

On the side facing the interior of the piston, the plug 52 is provided with a bursting disc seat 62, in which the bursting disc 42 is held so that it lies against the edge of the first section 56 on the side of the stepped bore facing the interior. The marginal section of the bursting disc seat 62 is beaded in a punctiform manner, so that the bursting disc is held by material projections 64 against the edge of the first section 56 of the stepped bore. The bursting disc is provided centrally with a bore 66.

Both the plug 52 and the bursting disc 66 are rotationally symmetrical. The bursting disc has a thickness of approximately 0.2 mm and the diameter of the bore 66 amounts to approximately 0.5 mm. The diameter of the first section of the stepped bore amounts to approximately 4 mm, and the diameter of the second section of the stepped bore amounts to approximately 3 mm. The length of the stepped bore along its longitudinal axis amounts to approximately 6 mm.

By providing a greater diameter on the inner side of the piston, it can be achieved that the bursting disc 42 is not supported across a comparatively large inner region, so that the bursting disc opens the through opening 40 already with a smaller internal pressure in the piston. Depending on the type of bursting disc which is used, the latter breaks when a predetermined pressure acts on it, or it deforms towards the exterior of the piston and slips out from the material projections 64 of the bursting disc seat 62, so that it is ejected out of the piston through the stepped bore. Due to the provision of a smaller diameter towards the exterior of the piston, the gas generated by the propellant charge is prevented from emerging as a shock wave after the destruction of the bursting disc 42; it emerges in a controlled manner. If a bursting disc is used, which is deformed and is driven out as a whole from the bursting disc seat, care is to be taken that the second section of the stepped bore has a sufficient diameter for the passage of the deformed bursting disc.

A material is used for the plug 52, the melting point of which lies below the spontaneous ignition temperature of the propellant charge 28. In this way, it is ensured that for example in the case of a vehicle fire, in which the propellant charge is heated up to its spontaneous ignition temperature and ignites, the end wall 26 is open prior to the spontaneous ignition of the propellant charge, so that the gas pressure developed by the propellant charge can escape from the linear drive, without effecting the actuation of the piston 22. The spontaneous ignition temperature of the propellant charge usually is more than 170° C., so that a tin/bismuth alloy with a melting point of approximately 140° C. to approximately 160° C. is suitable as material for the plug 52.

I claim:

1. A linear drive for a belt tensioner, comprising a pyrotechnic propellant charge, a cylinder tube and a piston displaceably arranged therein, said propellant charge, upon ignition, providing a pressurized gas acting on said piston, said piston having a hollow interior adapted to be subjected to said pressurized gas and an axial end at which an end wall is provided, said end wall having a bursting disc arranged facing said interior of said piston and a through opening formed by a stepped bore, said stepped bore having a first section facing said interior, and a second section adjacent said first section, said second section having a diameter which is smaller than a diameter of said first section, said bursting disc abutting at said edge of said first section of said stepped bore, said bursting disc being provided with a bore.

2. The linear drive of claim 1, wherein said bore of said bursting disc has a diameter of approximately 0.5 mm.

* * * * *